United States Patent [19]
Popolo

[11] Patent Number: 5,715,402
[45] Date of Patent: Feb. 3, 1998

[54] METHOD AND SYSTEM FOR MATCHING SELLERS AND BUYERS OF SPOT METALS

[75] Inventor: Carl A. Popolo, Carlisle, Mass.

[73] Assignee: Spot Metals Online, Bloomfield Hills, Mich.

[21] Appl. No.: 554,899

[22] Filed: Nov. 9, 1995

[51] Int. Cl.$^6$ .................................................. G06F 17/60
[52] U.S. Cl. ........................................... 395/237; 395/227
[58] Field of Search ................................. 395/201, 226, 395/227, 237

[56] References Cited

U.S. PATENT DOCUMENTS

| | | |
|---|---|---|
| 4,674,044 | 6/1987 | Kalmus et al. . |
| 4,677,552 | 6/1987 | Sibley, Jr. . |
| 4,799,156 | 1/1989 | Shavit et al. . |
| 4,903,201 | 2/1990 | Wagner . |
| 4,992,940 | 2/1991 | Dworkin ........................... 395/226 |
| 5,168,446 | 12/1992 | Wiseman ........................... 395/237 |
| 5,283,731 | 2/1994 | Lalonde et al. ........................... 395/201 |

Primary Examiner—Gail O. Hayes
Assistant Examiner—Steven R. Yount
Attorney, Agent, or Firm—Brooks & Kushman P.C.

[57] ABSTRACT

A system for managing steel inventories in order to reduce the time and expense associated with selling prime and secondary steel that is no longer needed for the original intended application. The system permits sellers to post detailed specification of an item for sale and permits buyers to browse or search the posted inventory to locate items filling specific needs. A buyer may bid on part or all of an item posted and the seller may accept or reject any bid. The buyer and seller engage in an auction by electronic mail and optionally by facsimile. The detailed specifications of the item may be expressed in a variety of unit of measure. Regardless, of unit of measure used by a seller in posting an item, the system performs the necessary conversions to display information to an interested buyer in a unit of measure set by the buyer. A hierarchial menu structure permits ease of use in selecting available options during posting or bidding an item.

9 Claims, 8 Drawing Sheets

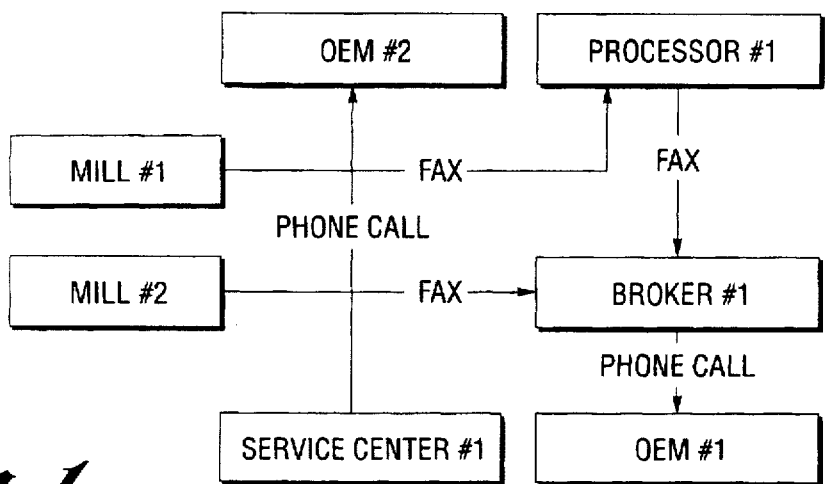
*Fig. 1*
*(PRIOR ART)*
*Fig. 2*
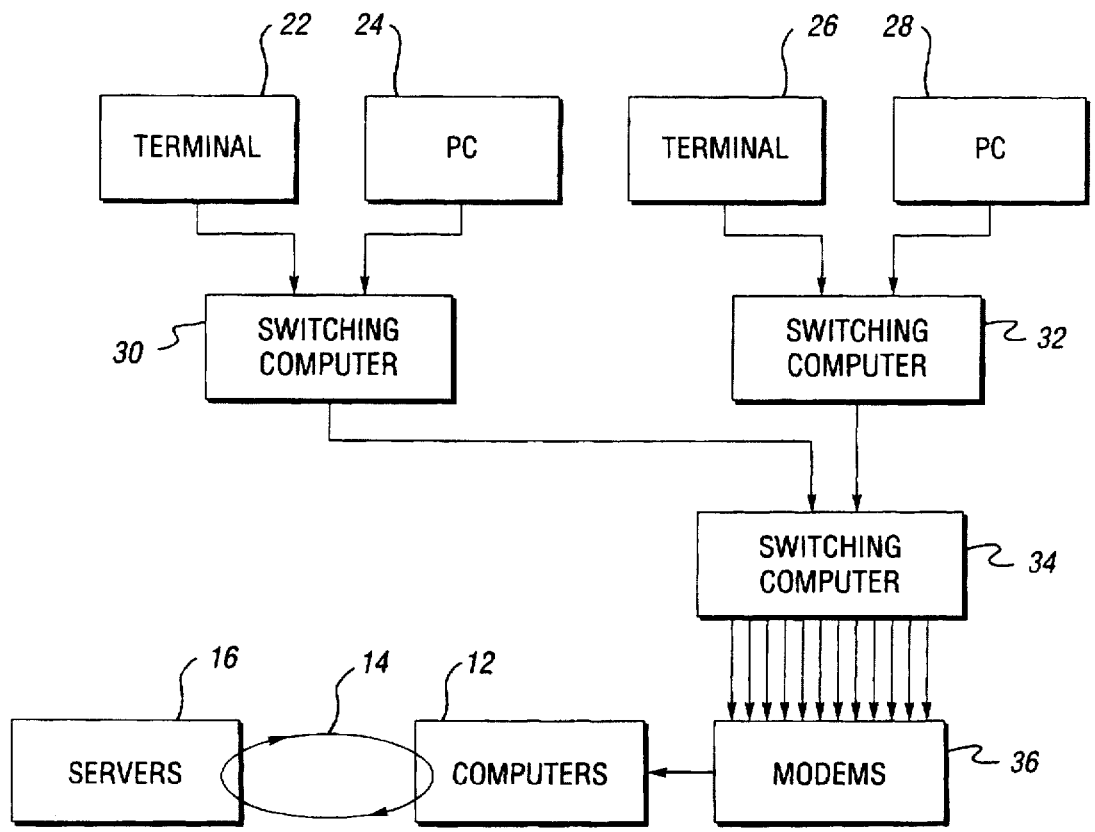

METHOD AND SYSTEM FOR MATCHING SELLERS AND BUYERS OF SPOT METALS

TECHNICAL FIELD

This invention relates to a method and system for conducting electronic negotiations of the sale of spot metals such as steel and more particularly to a system permitting sellers of spot steel to post items defined by detailed specification sheets and permits buyers to browse or search the inventory database and bid on such items by electronic mail.

BACKGROUND ART

Currently the interchange between buyer and seller of excess inventories or secondary steel products is relegated to the personal contacts made through a network of steel service centers and distributors. Lacking a coordinated system that provides the buyer with the full spectrum of available steel inventories, the inefficiencies associated with today's system works to the disadvantage, in most cases, of both the buyer and seller. Buyers who have limited access to steel to fill spot requirements will suffer negative economic consequences through higher transaction prices as well as excessive scrap and processing losses. The seller is impacted by working through a middleman network which in effect reduces sales revenues to support a "clean floor" philosophy.

The current process of transacting a sale of spot steel may be represented by the information flow depicted in the diagram of FIG. 1. A fragmented network of "old boy" relationships is employed where excess material is peddled to those players who have historically done business with providers of excess material. Consequently, neither availability nor price is optimized. Typically, the announcement of new material is via facsimile (fax), and interested parties reply to the supplier either by phone or fax. A typical fax might announce 10 items and provide the prospective buyer with only the very basic information; grade, size, available quantity and price. For example, using the diagram of FIG. 1. OEM #1 may purchase material from Service Center #1, unaware that Mill#2 has the same material at a more favorable price. In short, the current "channels" of distribution are really ruts of distribution carved over years of refinements to an archaic system.

SUMMARY OF THE INVENTION

With the foregoing in mind, it is an object of the present invention to provide an interactive on-line system for trading spot steel commodities.

It is another object of the present invention to provide a computerized system for the exchange of information between buyer and seller of spot steel commodities.

It is another object of the present invention to provide a system storing a detailed database of available steel products defined by a specification sheet filled out by seller of the product and which permits potential buyers to enter bids which are electronically mailed to the seller for acceptance or rejection.

In accordance with the present invention a system for managing steel inventories is proposed to reduce the time and expense associated with selling prime and secondary steel that is no longer needed for the original intended application. The system permits sellers to post detailed specification of an item for sale and permits buyers to browse or search the posted inventory to locate items filling specific needs. A buyer may bid on part or all of an item posted and the seller may accept or reject any bid. The buyer and seller engage in an auction by electronic mail and optionally by facsimile. The detailed specifications of the item may be expressed in a variety of units of measure. Regardless, of unit of measure used by a seller in posting an item, the system performs the necessary conversions to display information to an interested buyer in a unit of measure set by the buyer. A hierarchial menu structure permits ease of use in selecting available options during posting or bidding an item. The invention is designed to meet the needs of all channels in the steel processing community; mills, service centers, end-users, distributors and trading companies.

BRIEF DESCRIPTION OF THE DRAWINGS

Other objects and advantages of the present invention will be apparent from the following detailed description which should be read in conjunction with the drawings in which:

FIG. 1 show a prior art method of information exchange between buyers and sellers of steel commodities;

FIG. 2 is a block diagram of the present invention; and

DETAILED DESCRIPTION OF A PREFERRED MODE

Figure 3:
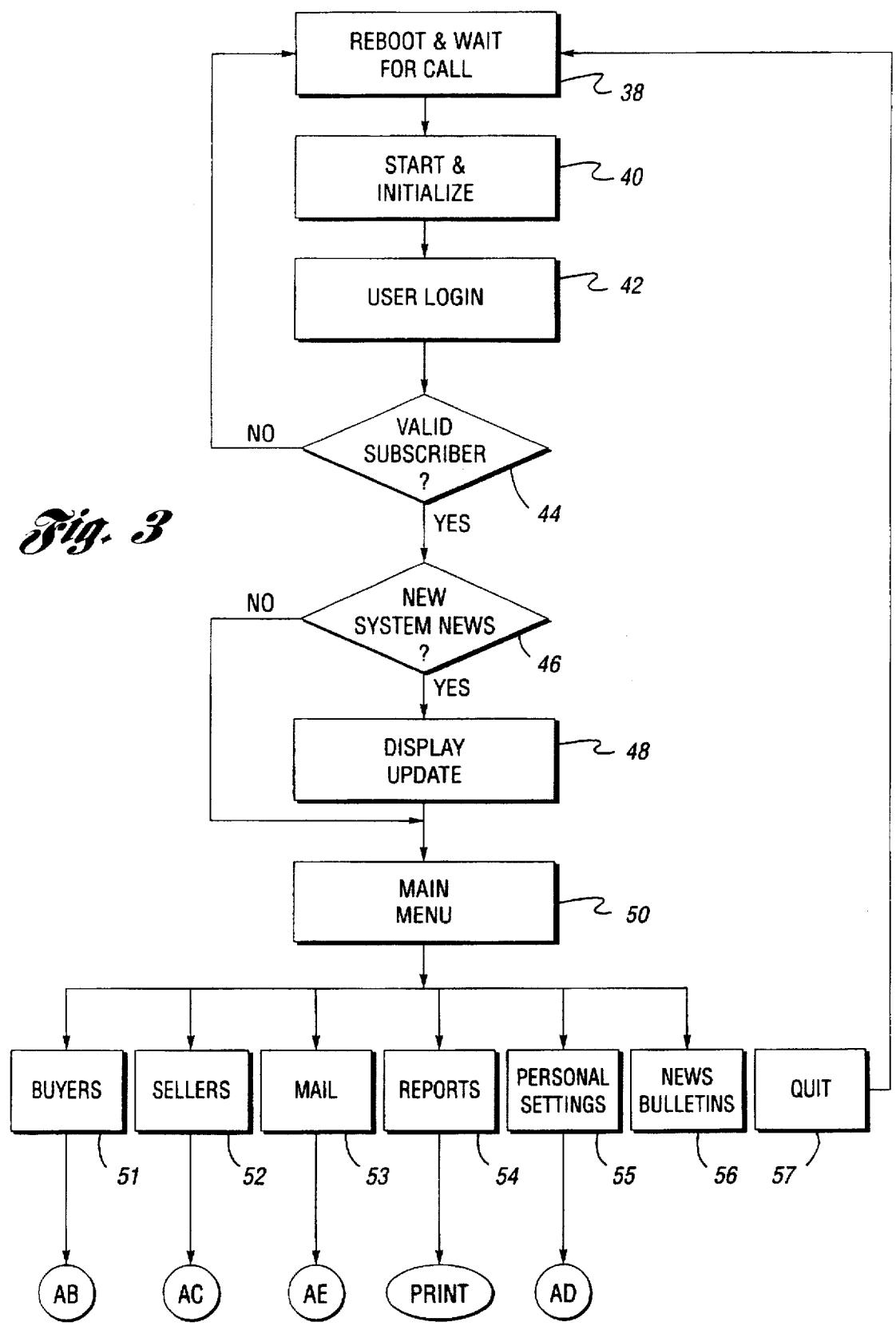
FIGS. 3–9 show flow diagrams of the application software of the present invention installed on the host computer.

Referring now to FIG. 2 of the drawings, a block diagram of the interactive on-line system for trading steel commodities is generally indicated at 10. The system includes a plurality of computers 12 interconnected by a local area network 14 with servers 16. The servers include a file server that controls data storage devices, a fax server that controls fax machines, and a print server that controls various printers. The computers 12 are accessible by remote dial-up system users or subscribers through devices 22, 24, 26, and 28, one of the central switching computers 30, 32, and 34, and a bank of modems 36. The remote devices may include terminals, or personal computers of various type and configuration. Though not shown each device includes either an internal or external modem and a suitable communication program permitting communication of data to and from the host computers 12.

Flowcharts of the program installed on the host machine are shown in FIGS. 3–9. Referring initially to FIG. 3, the system is normally in a wait mode as indicated by the block 38. Upon receipt of a call from a remote user, the system is initialized, as shown at block 40 and the user attempt to login at 42. If the user does not enter a valid password as determined by the block 44, then the system returns to the wait mode. Otherwise, a decision block 46 determines whether new system news has been posted and if so displays the update to the user as indicated at block 48. If not, the program progresses to a Main Menu indicated at the block 50. In this menu, the following options are displayed.

MAIN MENU

A. BUYERS MENU
B. SELLERS MENU
C. MAIL MENU
D. REPORTS
E. PERSONAL SETTING
F. SYSTEM NEWS
Q. QUIT AND DISCONNECT

Option A of the Main Menu permits a potential buyer to perform a number of functions associated with the purchase of items of inventory. These include such functions as browsing inventory, searching the inventory posted by sellers, reviewing the specification sheets of inventory items, bidding on items, and reviewing the status of bids previously made. A subroutine of the program is called by selection of Option A of the Main Menu, as indicated by the block 51.

Option B of the Main Menu permits a seller to perform a number of function associated with the sale of items. These include such functions as posting a new item for sale or reviewing items previously posted. A subroutine of the program is called by selection of Option B of the Main Menu, as indicated by the block 52.

Selection of Option C calls an electronic mail subroutine indicated by the block 53, permitting any subscriber on the system to communicate with any other subscriber. The mail subroutine 53 is also called automatically when a buyer bids on an item of inventory or the seller accepts or rejects the bid. In addition the subroutine 53 controls fax transmission between users as will be described further hereinafter.

Option D of the Main Menu permits a buyer or seller to generate various reports by calling a subroutine indicated at 54. Example include reporting all items bid by a buyer and all item posted by a seller.

Option E of the Main Menu permits the users to set personal preferences applicable to various entries make by the user and to set user defaults, as indicated by the block 55.

Option F of the Main Menu, calls a subroutine indicated at 56 that permits the user to view recent news bulletin from the system operator regarding system updates or changes.

Option Q of the Main Menu terminates the remote session and disconnect the user from the system as indicated at block 57.

PERSONAL SETTINGS (OPTION E)

Figure 4:
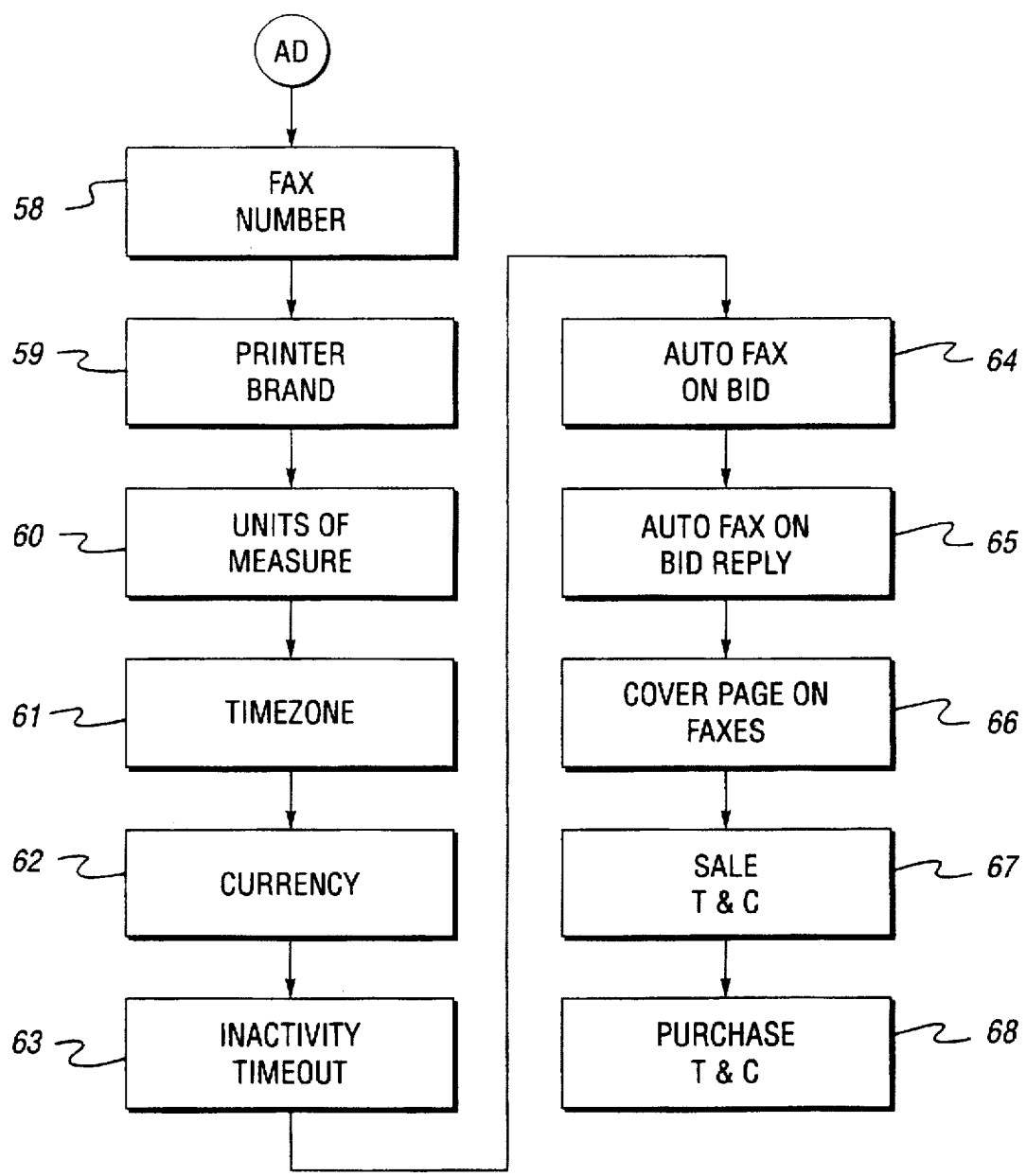
Figure 5:
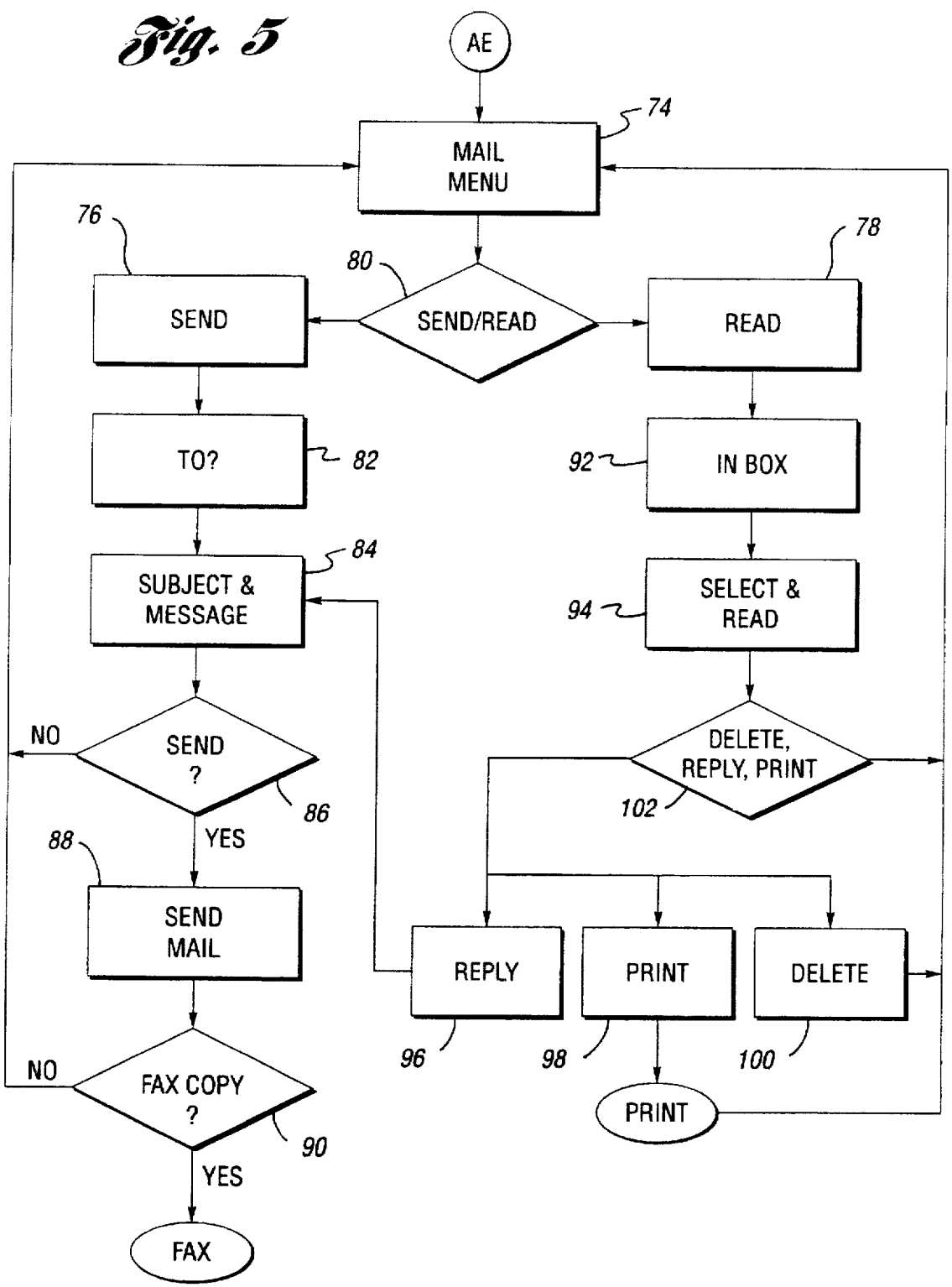

Referring now to FIG. 4, the personal preferences subroutine 55 which is called by selecting Option E of the Main Menu, is shown in greater detail. Upon initiation of the subroutine 55 a partially completed entry form is displayed to the user as shown below.

| SUBSCRIBER: | BILL TO: |
|---|---|
| Mr. John Doe | Mr. James Roe |
| President | President |
| Acme Steel Co. | The Roe Group |
| 123 Main St. | 321 Elm St. |
| Anytown, U.S.A. | Mytown, U.S.A. |
| VOICE PHONE: | PRINTER: |
| FAX: | |
| UOM Sizes | Timezone: |
| UOM Weights | Currency: |
| UOM Prices | |
| UOM Physicals | |
| Auto-disconnect time interval? | |
| Fax you upon bid on your item? | |
| Fax you when your bid is accepted or rejected? | |
| Cover Sheet on Fax to you? | |
| Terms and Conditions of Sale: | |

The user's name, address and voice phone number, and billing address as well as a user number are entered by the system manager when the user subscribes to the service. The user enters a fax number if one is available. The voice and fax numbers are compared by the system to determined whether a fax can be sent while the user is on-line. The user identifies the printer connected with the user's remote system, from a pop-up menu of supported printers. The user selects default units of measure, from respective pop-up menus, in order to specify which units of measure should be used in displaying the characteristic of the units in inventory to the user. Finally, the user identifies the local time zone, and selects the desired currency, from respective pop-up menus, all as indicated by blocks 58 through 62.

The user may also establish a time interval of inactivity, after which the remote system is to disconnected, as indicated at block 63. The user's establishes preferences relative to fax notification, as indicated at blocks 64, 65 and 66. A user may specify that when bidding on an item, a fax be sent automatically with the bid and may also specify that when accepting or rejecting a bid, a fax be sent automatically to the bidder. Finally, the user may enter text describing the terms and conditions of sale to be applicable to any item posted on the system, or the terms and condition of purchase when bidding on an item, as indicated by the blocks 67 and 68. The appropriate terms and conditions will automatically be entered in the specification sheet when posting an item for sale, or in any bid communicated from a buyer to a seller.

In the units of measure selection block 60, the user may select, with respect to size, whether all dimensions (gauge, width, length) of a posted item be displayed in inches or in millimeters. With regard to weights the user may select tons, pounds, kilograms, or hundredweights. With regard to prices the user may select a price per unit weight using the weight options stated above. The units of price depends on the currency selection. With regard to physicals the user may select thousand pounds/in$^2$ or MegaPascals. The user may select the currency of various countries including the United States, Canada, Germany, Spain, Japan, France and Mexico. For example, Subscriber No. 1 might post an inventory item where the quantity available is specified in tons and price is specified in dollars per ton. Subscriber No. 2, however, may elect to have all inventory items presented pounds and dollars per hundred weight. Conversion between the units of measure occur dynamically in real time and, therefore, afford a level of user friendliness not available in prior art systems where no automatic conversion takes place at the receiving fax machines. The receiver of the fax must manually transcribe all units of measure to his own desired nomenclature. It should be noted however, that the unit of measure selections in the personal setting do not prevent the user from entering values in another unit of measure when posting an item for sale.

MAIL MENU (OPTION C)

A user may communicate with other system users via electronic mail, by selecting Option C of the Main Menu. Selection of Option C calls the subroutine 53, shown in greater detail in FIG. 5, which displays an Electronic Mail Main Menu 74. From this menu, a user may send or read mail as indicated by the blocks 76 and 78, respectively. If the user selects to send mail, as determined by the decision block 80, then a mail message template is presented on screen, permitting the user to select a recipient from a subscriber list as indicated at block 82. After identifying the recipient, the user may identify the subject matter of the message and then enter the message as shown in block 84. After completion of the message, the user has the option of saving and sending the mail or of canceling the mail message as determined by the decision block 86. If the user elects not to send the message, then the program returns to the Mail Main Menu at 74. If the mail is to be sent then subroutine at block 88 is called. The user has the option of also sending a fax copy of the message to the recipient as indicated by the decision block 90. If mail has been sent to the user, the system will notify the user at the Main Mail Menu with a flashing indicator of the number of unread messages received. If the user selects the read option, an in-box of received messages is displayed, as indicated at block 92. At this point, the user may select and read any one of the messages in the in-box, as indicated at block 94 and may either reply, print or delete any message as indicated by the blocks 96, 98 and 100, as determined by the decision block 102. If a reply to the message is selected, then the send message subroutine is called at block 84 in order to send an electronic mail message and/or a fax copy to the party.

SELLERS MENU (OPTION B)

Figure 6:
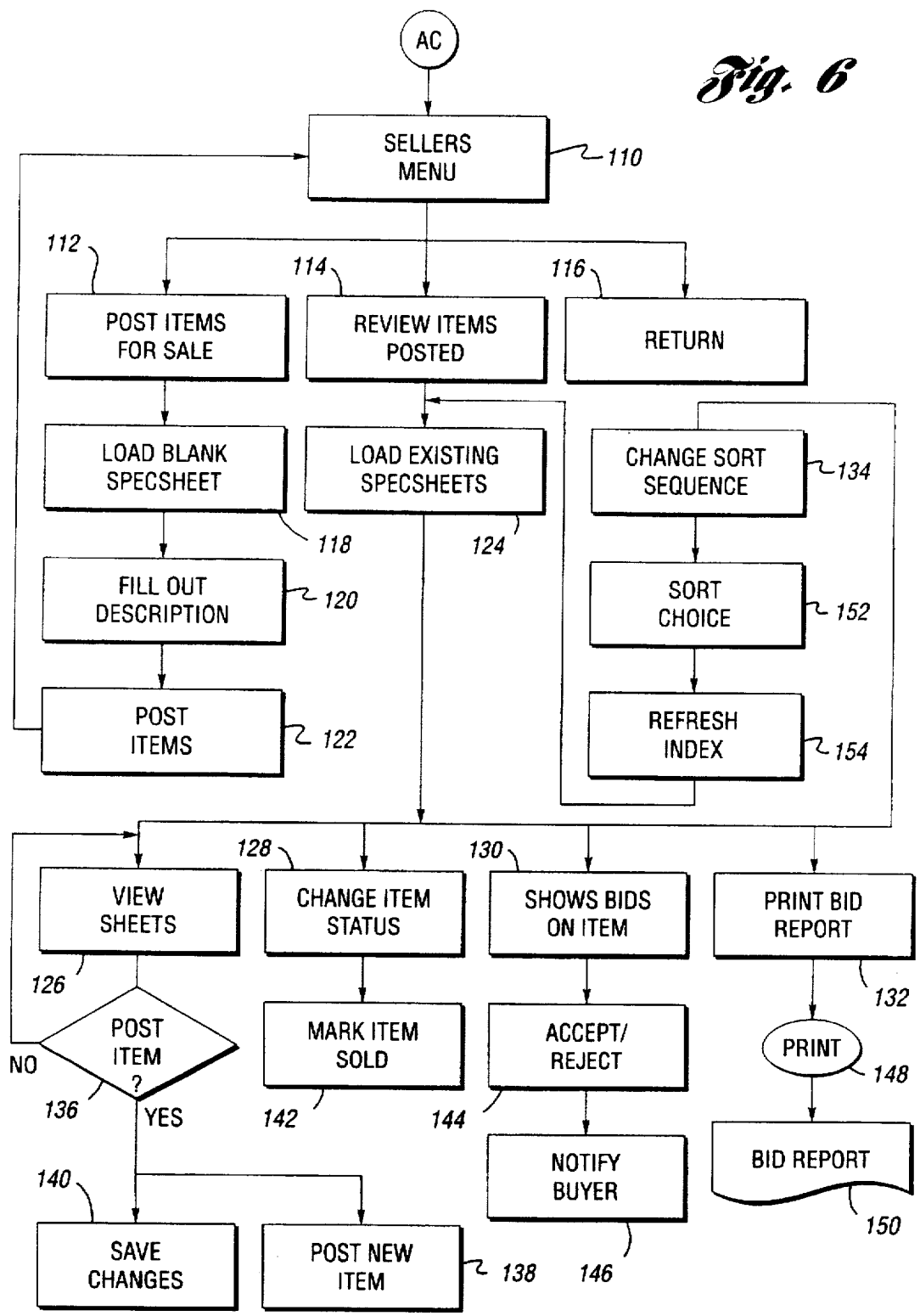

Selection of Option B of the Main Menu calls the subroutine shown in FIG. 6 which initially displays a SELLERS MENU indicated by the block 110. The SELLERS MENU permits the user to perform function of interest to a seller of steel by calling subroutines as indicated in blocks 112–116.

SELLERS MENU

A. POST AN ITEM FOR SALE
B. REVIEW ITEMS POSTED
C. RETURN TO THE MAIN MENU.

Upon selection of Option A of the SELLERS MENU, a Specification Sheet (SpecSheet) is displayed, as indicated at block 118. The SpecSheet requires the user to enter a detailed description of the item for sale, as indicated at block 120. After completion of the SpecSheet, the user has the option of posting the item, or returning to the seller's menu, as indicated at block 122. Posting the item, adds the item to the inventory database stored at the host computer location.

Figure 7:
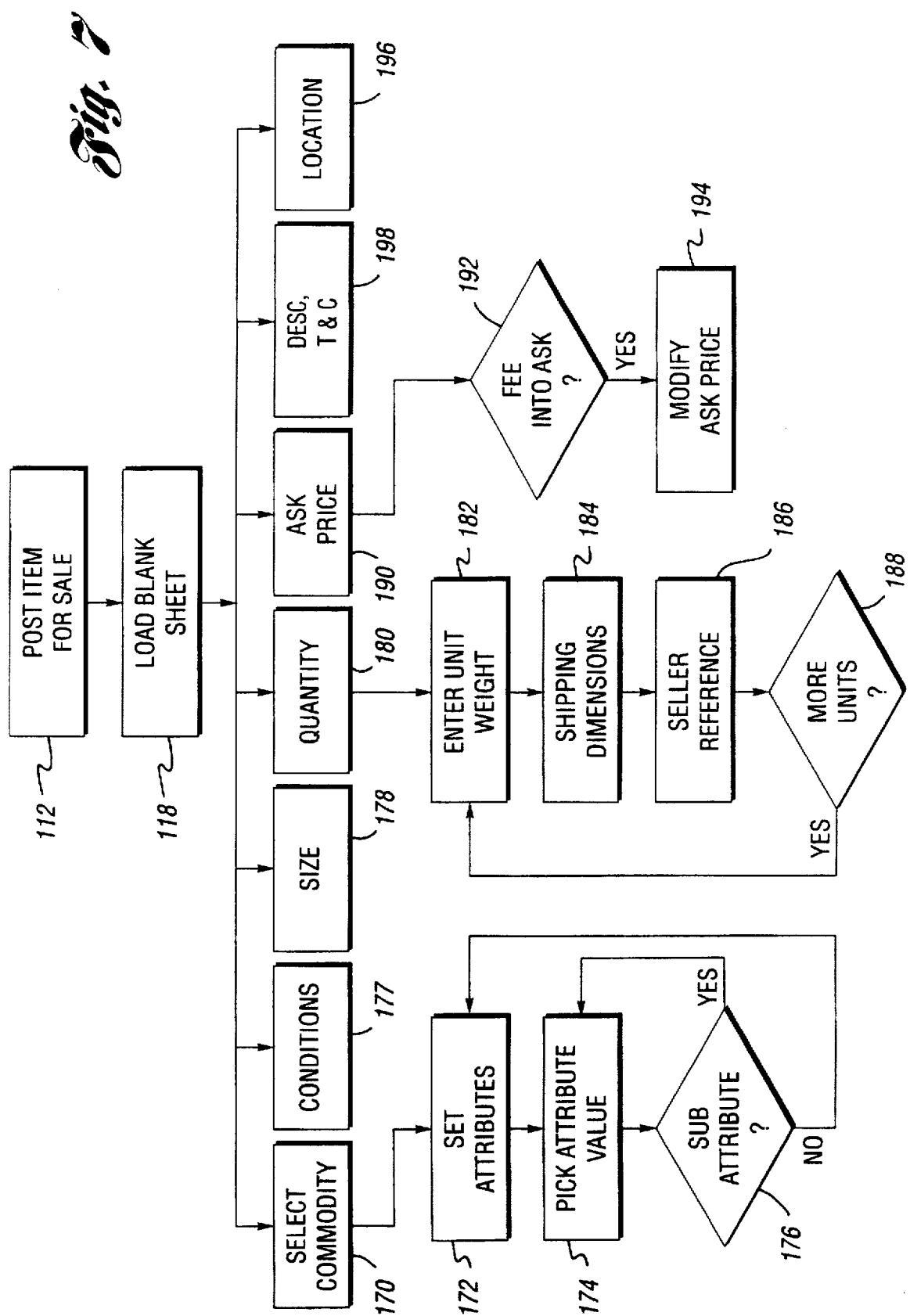

The process of filling out a SpecSheet, as indicated by block 120, is shown in greater detail in FIG. 7. A SpecSheet is a two-column browseable form, an example of which is shown below. Initially the SpecSheet is blank except for default data automatically entered from the personal settings of the user.

| SPEC SHEET for NEW ITEM | |
|---|---|
| ATTRIBUTE | CONTENTS |
| PRODUCT: | GZ = HOT-DIPPED GALVANIZED |
| QUALITY | DDQSK-FS, Deep Drawing Quality,Special Killed |
| CHEMISTRY | SAE/AISI 1006, UNS G10060; |
| SURFACE FINISH | Regular Spangle; |
| SURF TREAT | Oil; |
| COAT WEIGHT | AZ55, .55 OZ/FT TOTAL BOTH SIDES |
| SALE CONDITION | PRIME |
| SIZE GxWxL | 0.3600" min × 24.0000" × COIL |
| N° OF UNITS | 1 COIL |
| AVAIL QUANTITY | 23,000.0000 Lb |
| ASKING PRICE | 23.0877 $/CW |
| ITEM VALUE | $5,310.17 |
| FOB | Delivered |
| BIDS BY DATE | Tu 07 Nov 95 (End of business day) |
| OWNER ACCOUNT | 000014 |
| NAME | Mr John Doe |
| COMPANY | Acme Software |
| ADDRESS | 123 Main St. |
| CITY/ST/ZIP | Anytown, MI 48075 U.S.A. |
| PHONE | 810-123-4567 |
| FAX | 810-890-1234 |
| ADDITIONAL DESC | |
| TERMS/COND | |
| Post/Date/Time | Mon 30Oct95 15:22 EST |
| PHYSICAL LOCAT | Acme Software |
| | 123 Main St. |
| CITY/STATE/ZIP | Anytown, MI 48075 U.S.A. |
| ATTENTION | Mr John Doe |

| SPEC SHEET for NEW ITEM | |
|---|---|
| ATTRIBUTE | CONTENTS |
| PHONE | 800-123-4567 |
| FAX | 800-890-1234 |

-continued

The first section of the left column of the form shows various attributes of the item offered for sale, and the right column shows the value of that attribute.

An item, by definition, is a single entity of steel where all attribute values for that entity are the same. A seller can post any quantity (composed of one or more coils or lifts), but all attribute values of commodity code, size, price, condition, terms and location must be the same. If, for example, a seller is posting two coils of steel with different gauges, then those two coils must be posted as separate items. If all attribute values for the two coils are the same, then the seller may post both coils as one item, and will itemize the coil weights on the SpecSheet. When the user highlights a row and presses the ENTER key on the keyboard of the remote device, a pop-up list or mini-form appears that permits the seller to select from a list of predefined choices or enter a response on the form.

The selection and entry of commodity and attributes is controlled by the blocks 170–176 in FIG. 7. Positioning the highlight bar on the line designated PRODUCT, and pressing the ENTER key on the keyboard, calls the subroutine indicated at 170. This subroutine causes a pop-up list of COMMODITIES to appear, one of which must be selected by highlighting and pressing the ENTER key. The commodity list, for example, may include:

COMMODITIES LIST

1. HOT ROLLED
2. COLD ROLLED
3. HOT-DIPPED GALVANIZED
4. ELECTRO GALVANIZED
5. ZINCROMETAL
6. ALUMINIZED
7. PRE-PAINTED CR, HR, GZ
8. BLACK PLATE
9. TIN PLATE
10. CHROME PLATE

After one of the commodities is selected, the next few lines of attributes of the SpecSheet are specifically applicable to the commodity previously selected as indicated at block 172. All attributes don't apply to all commodities, and therefore the attributes are not displayed until the commodity is selected. For each of the attributes that are presented, a list of possible values for the attribute appears when the appropriate row is highlighted and the ENTER key is pressed. The user selects one of the values as indicated at block 174. In many cases, the selection made will produce a new list of values that further define the value selected as indicated by the decision block 176 (see the example below). In general, the product attribute selections are arranged in a hierarchy that allows selection of the appropriate value by making more and more detailed selections from the lists that appear. When the hierarchy goes no deeper, the user is returned to the SpecSheet, and the fully expanded attribute value will be shown on the sheet. In the example sheet shown above, the commodity HOT-DIPPED GALVANIZED has an QUALITY attribute which may be selected from a list displayed to the seller containing the following entries:

QUALITY LIST

0. DON'T KNOW, DOES NOT APPLY
1. CQ, COMMERCIAL QUALITY
2. DQ, DRAWING QUALITY
3. DQAK/DQSK, DRAWING QUALITY, KILLED
4. DDQSK-FS, DEEP DRAWING QUALITY, SPECIAL KILLED
5. DDQSK-ELC, DEEP DRAWING QUALITY, SPECIAL KILLED
6. X, LOW ALLOY
7. D, DUAL PHASE

Selecting Quality attribute #4 produces the following list of Chemistry attributes.

CHEMISTRY LIST

0. DON'T KNOW, DOES NOT APPLY
1. SAE/AISI 1006, UNS G10060
2. SAE/AISI 1008, UNS G10080
3. SAE/AISI 1009, UNS G10090
4. SAE/AISI 1010, UNS G10100
5. SAE/AISI 1012, UNS G10120
6. SAE/AISI 1015, UNS G10150
7. SAE/AISI 1016, UNS G10160
8. SAE/AISI 1017, UNS G10170
9. SAE/AISI 1018, UNS G10180
10. SAE/AISI 1019, UNS G10190

Selecting Chemistry attribute #1 produces the following list of Surface Finish attributes.

SURFACE FINISH LIST

0. DON'T KNOW, DOES NOT APPLY
1. REGULAR SPANGLE
2. MINIMUM SPANGLE
3. EXTRA SMOOTH (TEMPER ROLLED)
4. CRITICAL SURFACE

Selecting Surface Finish attribute #1 produces the following list of Surface Treatment attributes.

SURFACE TREATMENT LIST

0. DON'T KNOW, DOES NOT APPLY
1. STANDARD PASSIVATION (CHEMICAL TREATMENT)
2. OIL
3. PRELUE COATING-CONVENTIONAL TYPE
4. PHOSPHATIZED (PAINT BOND OR BONDERIZED)

Selecting Surface Treatment attribute #2 produces the following list of Coat Weight attributes.

COAT WEIGHT LIST

0. DON'T KNOW, DOES NOT APPLY
1. 2-SIDE GALVANIZED, FREE ZINC & IRON
2. AZ55, 0.55 OZ/FT TOTAL BOTH SIDES

The attribute selections, in this example, are completed by selection of Coat Weight attribute #1. The various attributes conform to AISI standards and a brief description of each selection in the hierarchial listing is displayed at the time the selection is required.

After selecting the values for the attributes, the SALE CONDITION line is highlighted and selected. The possible SALE CONDITION selection are:

1. PRIME
2. SECONDARY
3. LIMITED WARRANTY.

Selection of the SIZE attribute of the SpecSheet calls the subroutine indicated at block 178, and a pop-up mini-form is displayed, which permits entry of the GAUGE, WIDTH and LENGTH dimensions of the steel sheet, and the preferred unit of measure (UOM) for the dimensions. After entering the gauge (thickness), the user is prompted to enter N for Nominal gauge, or M for Minimum gauge in accordance with AISI definitions. If the item to be posted is cut-length or blanks, the width and length of the strip is entered. If the item is a coil, a zero length is entered. Finally, the unit of measure that goes with the numeric values entered is specified. The default selection in the English/Metric pop-up box is the default that was set in the Personal Settings option from the Main Menu.

The quantity of the item to be posted is entered by highlighting and selecting the AVAIL QUANTITY lines which calls the subroutine indicated at block 180 and displays a list of materials as follows:

1. COIL
2. CUT LENGTH
3. SLAB
4. BLANKS
5. IRREGULAR
6. OFFALL

All units for an item must be of the same form. If the user wishes to post one coil and one slab, these two units must be posted as separate items even if all other attributes of the two units are the same. After identifying the form and available quantity of the material, the user may enter the weight of each item through a pop-up entry form, as indicated at 182. This entry form includes the following fields for entry of data:

1. UNITS
2. WEIGHT
3. UOM
4. DIMENSION
5. REFERENCE NUMBER

The nominal weight for the unit being sold is entered into the form using a unit of measure most convenient for the seller. The unit of measure used by the seller is also identified through a pop-up menu on the form. The seller may also enter a phrase that describes the physical dimensions of the unit, as indicated at 184. Typically, these dimensions are important from a shipping and handling standpoint. For example, the seller might signify the inside and outside diameters of the coil (and a buyer would know that the width of the sheet is the other important dimension). For a lift, the seller might specify the height, width and length of a bundled lift. The seller also enters a seller internal reference number, as indicated at 186. The internal reference number identifies the particular unit such as a coil identification number or other mill identification. This reference number is useful should it be necessary to correlate the seller's internal documentation.

As stated before, an item can be composed of several units, as long as each of the units have the same attributes of commodity, chemistry, size, price, etc. But as a convenience to those situations where a particular lot of steel may be composed of individual units that can be sold separately, the system allows the seller to itemize the individual units, and buyers can bid on these individual units. In short, if the item being sold can be divided and sold in distinct and separate portions or units, then the seller may itemize those portions in the SpecSheet (instead of posting a new item for each of the individual units), as determined by the decision block 188.

The system assigns each posted unit an initial Status of AVAILABLE for sale. As bids and other inquiries develop on individual units, the seller changes the status of each unit to one or more of the following categories:

1. COMMITTED (the unit is committed to a buyer but the sale has not yet been consummated and the seller wishes to discontinue further bids).
2. SOLD (the unit has been sold to another subscriber. This status removes the unit quantity from the total available quantity of the item so that the main Inventory browse correctly reflects how much steel is left to buy).
3. REMOVED (the unit quantity is removed from the total available for sale because the item was sold off-line or has become unavailable for sale for some other reason).

The ASKING PRICE of the item is calculated by calling the subroutine at block 190 which displays the spreadsheet shown below.

| | ASKING PRICE | |
|---|---|---|
| (A) | N° OF UnitS: | 1 |
| (B) | TOTAL WEIGHT: | 23000.0000 pounds |
| (C) | ASKING UNIT PRICE: | 23.0877 $/hundredweight |
| (D) | ASKING TOTAL VALUE: | $5,310.17 |
| (E) | FEE: | 0.60% |
| | | $31.86 |
| (F) | ROLL FEE INTO ASK: | No |

The first two lines in the spreadsheet are completed by the system from the data already available to remind the seller of the number of units and the total quantity to be posted. On line (C) the seller enters the numeric value of the asking price for the item and then specifies the unit of measure for that price, from a pop-up menu. Line (D) is simply line (B) multiplied by line (C) after normalizing both to a common unit of measure and is calculated by the system computer. Line (E) is also calculated, based on the sellers current month-to-date postings activity on the system, the fee rate, in this case 0.6% of the total asking price, is shown on the first of the two lines. The service fee of $31.86 is shown on the next line. The seller is prompted to select whether the fee should be rolled into the asking price, as indicated by the decision block 192. If so, then the asking price is increased, at block 194, to include the fee.

The ITEM VALUE entry, shown on the SpecSheet, is simply the AVAILABLE QUANTITY input multiplied by the UNIT ASKING PRICE input. This value will drop automatically when the seller marks the individual units of the item as Sold. For the buyer, this line shows, at a glance, the total cost to purchase the entire item. For the seller, this line serves as a reasonableness check that the quantity, price and their respective units of measure were entered correctly.

At the FOB (Free On Board) entry line the seller may select "Shipping Point", indicating the buyer will pay the freight or "Delivered", indicating that the seller will assume the freight charges.

At the BIDS BY DATE entry line the seller may select a timeframe during which bids or inquiries must be received. The selection list includes the following:

A—NO DEADLINE
B—ONE WEEK FROM TODAY
C—ONE MONTH FROM TODAY
D—SPECIFIC DATE

This entry permits the seller to either leave the offer open ended as to time or to require that all bids or inquiries be received before a certain date.

The next section of the SpecSheet contains information regarding the seller and is entered by the system from the Personal Settings data of the seller for the benefit of a potential buyer. If the steel being posted is located other that at the address stated in this section, the seller can highlight the PHYSICAL LOCATION line of the SpecSheet and call the subroutine, indicated at block 196. When a blank SpecSheet is initially displayed, the PHYSICAL LOCATION section defaults to the seller's billing location. If the steel is actually located elsewhere, the seller edits these lines on the SpecSheet. The point of specifying the location of the steel is primarily for the benefit of a potential buyer.

Selecting the ADDITIONAL DESCRIPTION field calls the subroutine at block 198 which opens a text box that permits the seller to further describe the item for sale in the seller's own terminology. For example, if the item has exceptional hardness properties the Rockwell B measurements might be entered in this section. The first line of the ADDITIONAL DESCRIPTION text appears at the bottom of the Inventory screen and is viewable by buyers when browsing the inventory. The first line should therefore provide a concise summary of the item for sale.

Selecting the TERMS AND CONDITIONS OF SALE line also calls the subroutine at block 198 which opens a text entry box that initially contains the seller's standard Terms & Conditions entered via the PERSONAL SETTING, Option E of the MAIN MENU. The Terms & Conditions for the sale of this specific item may be modified by editing the default text.

Selecting the POST ITEM line calls the subroutine at block 142 which displays the following options:

POST ITEM MENU

1. POST THIS NEW ITEM
2. PRINT THE SPECIFICATION SHEET
3. EXIT

By selecting Option 1 of the Post item Menu, the seller confirms that the item, defined by this new SpecSheet, should be posted. The time and date of the posting is entered by the system. The item is assigned a unique number and now appears on the main Inventory screen for all buyers to see. This post time entry is displayed to users browsing the inventory.

If the user select Option B of the SELLERS MENU, the subroutine indicated at block 114 is called and a list of all items previously posted i$ displayed as indicated at 124. The options available to the user at this point, with respect to any one of the items displayed, are indicated at blocks 126–134. Any one of the items displayed may be selected by the user by highlighting the item by pressing the up/down arrow keys on the keyboard. These options available with respect to an item selected are displayed in a submenu, shown below, by pressing an Action Key on the users keyboard, such as the F10 key.

SELLER'S SUB-MENU #1

A—VIEW/EDIT ITEM XXXX DETAILS
B—VIEW/EDIT ITEM STATUS
C—SHOW BIDS ON ITEM XXXX
P—PRINT BID REPORT

S—CHANGE SCREEN SORT SEQUENCE
Q—RETURN TO BROWSE

When Option A of Seller's Sub-Menu #1 is selected, subroutine 126 is called and the SpecSheet for that item is displayed for viewing or editing. As indicated by the decision block 136, an existing posting may be used as a template, as a time saver in posting a new item, particularly where the new item has many attribute values in common with the prior posting. The item to be used as a template is merely selected and edited to conform to the new item and designated a new posting, as indicated at block 138. This operation should be distinguished from editing and saving the changes to an existing posting, as indicated by the block 140. In the latter case the item number remains the same and no additional service fee is incurred. In the former case a new item number is assigned at the time of the new posting and a service fee is incurred.

Selection of Option B of Seller's Sub-Menu #1 permits the user to view and edit the status of certain posted items. After an item has been posted for one day or more the quantity of the item posted cannot be edited. However, the seller can, if desired, mark the item as sold in the SpecSheet Status field, as indicated at block 142, in order to discourage further inquiries on the item.

Selection of Option C of Seller's Sub-Menu #1, displays all posted items bid upon by other users. The seller may accept or reject a bid, as indicated at block 144. In this case the system automatically notifies the buyer of the acceptance or rejection by electronic mail, as indicated at block 146. The acceptance or rejection message will appear as new mail in the Electronic Mail Main Menu of the buyer.

Selection of Option P of Seller's Sub-Menu #1, calls the subroutine indicated at block 132, starting a print job at the remote users site, as indicated at 148 and the subsequent printing of a bid report as indicated at 150.

Selection of Option S, of the Seller's SubMenu #1, calls the subroutine 134 which displays a screen giving the seller various sort choices as indicated at block 152 and the index of items is refreshed in accordance with the sort criteria selected, as indicated at block 154.

In order to assist a seller, in keeping track of buyer activity, (inquiries and bids) on items for sale, the system tracks and advises the seller of the number of subscribers (both buyers and sellers) who have viewed or printed the SpecSheet of an item posted by the subscriber. Subroutine 124, when called, displays the following panel listing the posted items and including columns labeled Inquiries and Bids.

An inquiry counter is incremented each time a subscriber either views or prints the SpecSheet for an item. Multiple reviews or reprints by the same subscriber are not counted a second time, so this count reflects only the number of different subscribers that have reviewed the item. "Bids" are electronic mail forms, sent to the seller by the system in response to a bid by an interested buyer. A bid will contain a formal offer to purchase one or more of the units of a specific item, and it will contain a bid price. The seller responds to all bids, either accepting or rejecting the offer. All that is required of the seller is to respond to the electronic mail message and accept, decline or negotiate with the buyer. If the seller accepts or declines the offer as made, the buyer is notified of the acceptance automatically by the system. If accepted, the buyer and seller can arrange the physical movement of money and steel either off-line or through electronic mail communications. The seller can specify, in Personal Settings at the Main Menu, that any bid be automatically sent to a local fax machine so that the seller need not continually monitor the system for activity relative to any of the items posted.

Another column labeled STATUS in PANEL #1 is always the "lowest status" of the units that make up the item. If the item is composed of a single unit, then the item status is the same as the unit status. But if, for example, the seller has an item composed of two units, one of which is sold and one of which is available, then the status will show AVAILABLE, and the quantity column will show only the quantity of the unit that is still available. Only when both units are sold will the entry in the status column screen change to Sold.

For any item with at least one Bid showing in the Bid column, the seller receives electronic mail from the bidder with the full information of the bid. Specifically, the electronic mail received will contain the identity of the bidder, bid price, and a brief description identifying the item in question. The seller can review a summary of bids from this screen, in one of two ways:

(1). By pressing the Action key at the ITEMS POSTED FOR SALE panel, PANEL #1, the SELLER'S SUB-MENU #1 is displayed. By selecting Option C of the SELLER'S SUB-MENU #1, PANEL #2 shown below is displayed.

PANEL # 1
ITEMS POSTED FOR SALE

| ItemN° | CC | GAUGE " | WIDTH " | QTY Lb | ASKING$ /C | VALUE US | INQYS | BIDS | STATUS |
|---|---|---|---|---|---|---|---|---|---|
| 002076 | GZ | 0.3600 | 24.000 | 46,000 | 23.09 | 10,620 | 0 | 0 | AVAILABLE |
| 002081 | GZ | 0.3600 | 24.000 | 23,000 | 23.09 | 5,310 | 0 | 0 | AVAILABLE |

| | | PANEL # 2 | | | | |
|---|---|---|---|---|---|---|
| | | BIDS ON ITEM XXXXX | | | | |
| Line N° | Bidder | BidDate/Time | BID$ /$/CW | Bid/ Ask% | QTY Lb | Total Offer Status |
| 001 | 000002 | We01Nov95 11:07 | 21.750 | 94.2 | 23,000 | 5,003 |
| 002 | 000002 | We01Nov95 11:07 | 20.750 | 89.9 | 23,000 | 4,773 |
| | | Bidder Info  Remaining | | | | |
| Mr Bidder | | | | 001 Qty Avail: | | 23000.00 Lb |
| President | | | | | | |
| The Acme Group, Inc. | | | | | Bidder summary | |
| Fieldstone Hills MI 40000-0000 US | | | | Bids On: | 2 Units | |
| Phone--800-123-4567 | | | | Total Qty: | 46000.00 Lb | |
| Fax----800-123-4568 | | | | Total Value: | 9775.00 US$ | |

For each unit of the item, the bid or bids on that unit are displayed, sorted from high bid price to low. Where the bid price is in excess of the asking price, the price is shown with a Bid/Ask percentage in bright white in order to draw attention to an item where the bidder has bid a premium price. A Bidder Info box appears below and to the left of PANEL #2 and provides additional information about the bidder. A Bidder Summary box appears below and to the right of the panel and gives a summary of this bidder's action on this item. At this point, the seller can respond to any bids received.

(2). By selecting Option P of the SELLER'S SUBMENU #1, a hardcopy of bid activity on all posted items is provided to the seller by the system on the seller's local printer.

While reviewing a bid as described in (1) above, pressing the Action key displays a list of the following choices:

ITEMS BID MENU

A—ACCEPT BID
B—REJECT BID
C—MARK SOLD TO THIS BIDDER
D—CLEAR BID STATUS (Item available)
E—ENTER AN OFFLINE BID
P—PRINT BID REPORT
R—DONE, PROCESS BID REPLIES
Q—NO ACTION, RETURN TO BIDS A bid is accepted by highlighting an item that has been bid, and selecting option A of the ITEMS BID MENU. Any tentative acceptances on other bids for this same units are automatically rejected. A bid is rejected by highlighting an item that has been bid, and selecting option B of the ITEMS BID MENU. The system sends an electronic mail message to the bidder declining the offer to purchase.

Option C of the ITEMS BID MENU should be selected if the seller has already negotiated the sale of this unit with the bidder shown. Selecting this option will mark the unit sold and it's quantity will be removed from the Available Quantity for the item that shows on the main Inventory panel as well as the SpecSheet.

Selecting Option D of the ITEMS BID MENU clears the status field in the main Inventory panel as well as the SpecSheet.

Option E of the ITEMS BID MENU should be selected to input information about a bid that was not received through the on-line system. If, for example, a potential buyer contacts the seller by phone and makes a bid, the seller can enter that bidder's information manually so that this bid may be evaluated in the context of other bids received and will be included when bids are reported or reviewed on-line.

Selecting Option P of the ITEMS BID MENU calls the print subroutine, indicated at block 132 which prints a report locally of bids on the selected items.

After some or all of the bids are marked as "accepted" or "rejected", Option R is selected which prompts the seller to decide whether or not to post the bid actions entered. If accepted or rejected, the response is stored and electronic mail is sent to the appropriate bidders either accepting or rejecting the particular bids.

It is not necessary to decline all bids at the same time. However, accepting any one bid, implies that all other bids for the same unit are rejected, and the appropriate rejection messages are sent to the unsuccessful bidders for that unit. If a bidder has requested that a fax confirmation be sent with any bid respons, in the Personal Settings, then the bidder pays for the fax confirmation. If not, the system charges any fax confirmation to the seller.

BUYERS MENU (OPTION A)

Figure 8:
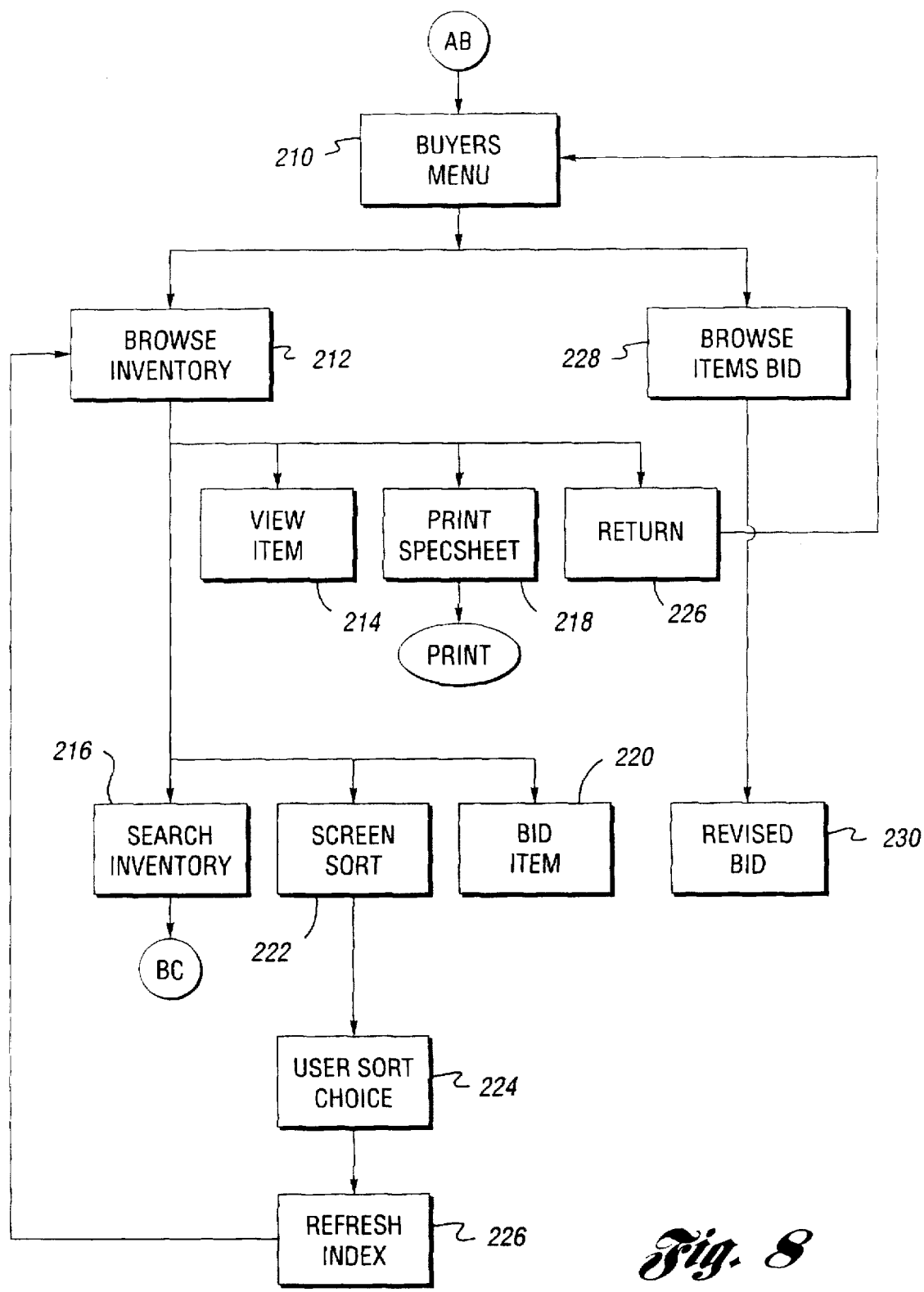

Selection of Option A at the Main Menu calls the subroutine 64, which initially displays the Buyers Menu indicated at 210 in FIG. 8. The Buyers Menu includes the following options:

BUYERS MENU

1. REVIEW ALL ITEMS FOR SALE
2. REVIEW ITEMS BID
3. RETURN TO MAIN MENU

By selecting Option #1 of the BUYERS MENU, the subroutine 212 is called which displays the entire inventory in a default sort sequence, as shown in the following panel:

PANEL #3

| ItemN° | CC | Q | GAUGE " | WIDTH " | QTY Lb | AskValue $ | AskValue $/CW | ITEM LOCATION | BidBy |
|---|---|---|---|---|---|---|---|---|---|
| 002070 | HR | 2 | 0.0540 | 24.000 | 30,000 | 7,530 | 25.10 | MI Southfield | |
| 002071 | EG | 1 | 0.2300 | 48.000 | 24,400 | 5,388 | 22.08 | MI Southfield | |
| 002072 | HR | 1 | 0.6400 | 24.000 | 24,500 | 5,533 | 22.58 | MI Southfield | |

F1 =HELP   F10 =Actions   ENTER =ViewItemDetails   Esc =Return and permits the user to browse the entire inventory.

The Item number is color coded, to quickly convey certain important information. When an Item number is shown in WHITE, the SpecSheet of the item has not yet been reviewed. Item numbers shown in BLUE, conversely, are items that have been reviewed. The blue color is used to make the item blend into the background so that it is deemphasized on the screen to reduce it's visual attraction. Items POSTED by the user are shown in BRIGHT WHITE. Items the buyer has bid on are shown in BRIGHT RED. Items that have been sold remain listed in the inventory for a short period of time and are shown in GREEN. The item remains on the system to give the Buyer and Seller a chance to complete the sale and physically move the steel. This grace period allows the seller to "undo" the sale without needing to re-post the item if for some reason the buyer is unable to complete the purchase.

The user may highlight any item and view the complete SpecSheet for that item by pressing the ENTER key. By pressing the Action key at PANEL #3 the following menu of options is displayed.

BUYERS SUB-MENU #1

A. VIEW ITEM XXXX DETAILS
B. SEARCH INVENTORY
C. PRINT
D. BID ON THIS ITEM
S. CHANGE SCREEN SORT SEQUENCE
T. TAG ITEM FOR LATER PRINT
Q. NO ACTION, RETURN TO BROWSE

Selection of Options A–Q of the BUYERS SUB-MENU #1, calls the appropriate subroutines indicated at 214–226. The user can search for items meeting a selected criteria, and set the screen sort order so that similar items are arranged near each other for easy comparison. The inventory browse shows the basic attributes for each item. For any item of potential interest, that item may be highlighted and by then pressing ENTER the SpecSheet for that item is displayed for review. A buyer can search the inventory to quickly narrow the focus to only those items that satisfy a particular criteria of commodity, dimension and seller. The parameters of this or other search criteria can be stored for future use. Sellers can also create search sets in order to compare asking prices with similar offerings of other sellers. For example, if a seller regularly posts large quantities of Hot Rolled of a particular size, a search set could be established which evaluates all items in this commodity and size to see the asking price range. This information may assist the seller in establishing a reasonable asking price.

After selecting Option A of the BUYERS SUBMENU #1, the SpecSheet is displayed and may be printed. If desired, a bid on the item may be entered. A bid on the item may also be entered by selecting Option D, producing the following panel:

PANEL #7

| Line | Bid/Tot | Avail/BidQty | Status | Asking$ | Bid$ | %Discount |
|---|---|---|---|---|---|---|
| 1 | 0/ 10 | 500,000 Lb | AVAILABLE | 110,440 | 0 | 100.0 |
| 2 | 0/ 5 | 55,000 Lb | AVAILABLE | 12,148 | 0 | 100.0 |
| | | | Total Bid | | | |
| | | | (nothing bid yet) | | | |

To bid on the item in line 1 of PANEL #7, the line is highlighted and the ENTER key is pressed to diplay the following panel:

PANEL #8

| Units | ApproxWeight | UoM | YourBid | UoM | -OR- | BidBy%OfAsk |
|---|---|---|---|---|---|---|
| 10 | 500,000.000 | Lb | 0.2209 | # | | 100.0 |

This panel permits the Buyer to bid up to 10 units of the item based on an amount per unit weight or as a percentage of the asking price. In this example the asking price is $0.2209 per pound. By cursoring to this field an amount may entered or by cursoring to the next field the entry of a percentage will automatically fill in the bid price. After a bid is entered for the specified number of units, PANEL #7 is updated with the total amount bid as shown in PANEL #9 below.

PANEL #9

| Line | Bid/Tot | Avail/BidQty | Status | Asking$ | Bid$ | %Discount |
|---|---|---|---|---|---|---|
| 1 | 5/ 10 | 250,000 Lb | AVAILABLE | 110,440 | 44,176 | 20.0 |
| 2 | 0/ 5 | 55,000 Lb | AVAILABLE TOTAL BID | 12,148 | 0 | 100.0 |

5 COIL , 250000.000000 Lb, 44176US$ 17.67 $/CW
Additional Bid Comments or Qualifications
ENTER =BidOnUnit   F5 =BidAllSameAs   F10 =Done&Return A text box is displayed to permit the user to add additional bid comments or qualification. When entry is completed by pressing the Action key F10, the following menu item is displayed permitting the user to complete or continue the bid process.

BID MENU

YES—SEND BID FOR $44,176.00
NO—ABANDON BID
NO—CONTINUE

If Option S of the BUYERS SUB-MENU #1 is selected the user is given a choice of sort criteria as indicated in block 224 and thereafter the screen is refreshed based on the sort criteria as indicated at block 226.

If Option B of the BUYERS MAIN MENU is selected, a subroutine indicated at block 228 is called which displays only those items in inventory previously bid by the subscriber. At this panel the user may press the Action key and select from the following menu.

BUYERS SUB-MENU #2

A—VIEW/EDIT ITEM XXXX DETAILS
B—SEND A REVISED BID ON ITEM XXXX
C—PRINT SHEET
D—PRINT SUMMARY OF YOUR BIDS
Q—NO ACTION, RETURN TO BROWSE

By selecting Option B of the BUYERS SUB-MENU #2, a buyer may revise a previous bid, not yet accepted, as indicated in block 230. The revision process involve editing the data originally entered during the bid process and then posting the item.

By selecting Option B of the BUYERS SUB-MENU #1, the user calls the search subroutine at block 216, which displays the following search panel showing the existing search sets.

by highlighting line 3. In either case pressing an Action key displays the following menu for the line selected.

SEARCH MENU

A—EDIT PARAMETERS FOR SEARCH SET #
B—PERFORM SEARCH FOR SEARCH SET #
C—PERFORM SEARCH FOR ALL SEARCH SETS
E—CLEAR PARAMETERS IN SEARCH SET #
Q—NO ACTION, RETURN TO BROWSE

Selection of Option A calls a subroutine indicated at block 242 which displays a further menu of possible commodity selections as indicated at 244. After one of the commodities is selected the following menu is displayed.

PANEL #11

DESCRIPTION OF SEARCH CRITERIA SET #1

COMMODITY: COLD ROLLED
GAUGE RANGE: 0.0700 1.0000
WIDTH RANGE: 40.0000 60.0000 SELLER=(All Sellers)

After setting a gauge range and width as indicated in block 246, to search may be limited to one preferred seller or include all sellers, as indicated at block 248. After completing this criteria set, the search may be initiated using one or more of the set criteria, as indicated at 250. The items found in the search are then displayed, as indicated at 252. The program flow returns to the subroutine at block 212 to permit the buyer to perform various options discussed above in connection with the subroutine.

While the best mode for carrying out the present invention has been described in detail, those familiar with the art to which this invention relates will recognize various alternative designs and embodiments for practicing the invention as defined by the following claims.

PANEL #10
SEARCH SETS

| DESCRIPTION | Last Search | CC | MIN GAUGE | MAX GAUGE | ITEMS | QUANTITY Lb | VALUE US$ |
|---|---|---|---|---|---|---|---|
| 1 Search #1 | 10/15/95 | CR | 0.070" | 1.000" | | | |
| 2 Search #2 | 10/15/95 | HR | 0.050" | 0.900" | | | |
| 3 | | | | | | | |
| 002067TP1 | 0.0055 | | 43.000 | 50,000 | 21,586 | 43.17 | Carlisle, MA |
| 002068CR1 | 0.0450 | | 54.000 | 555,000 | 122,600 | 22.09 | Ashford, KY |

Figure 9:
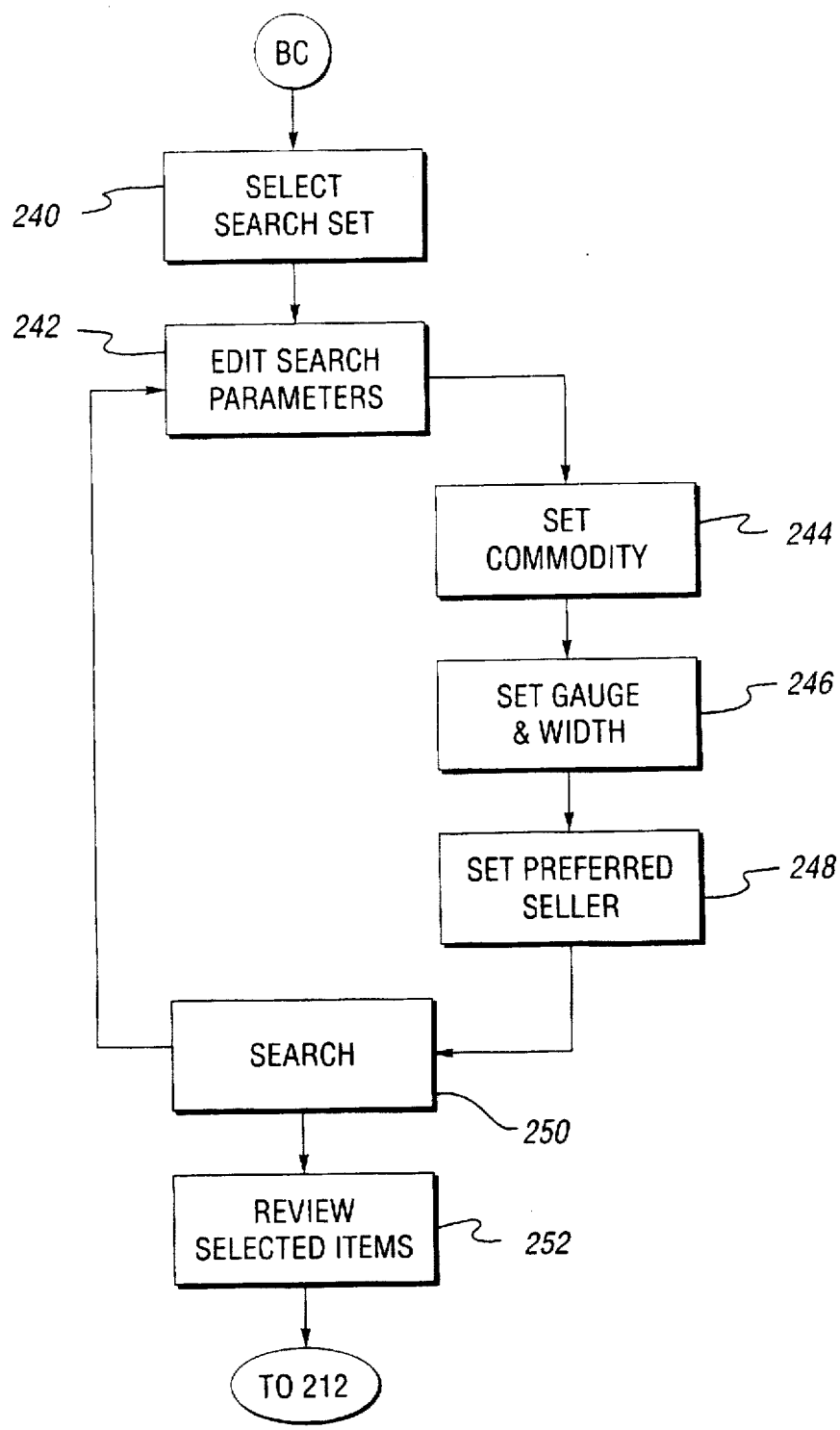

An established search set may be selected by highlighting the appropriate set as indicated at block in FIG. 9. Similarly, a new search set can be established and added to the set list

What is claimed is:

1. A computerized method of assisting remote users in the process of buying and selling spot metals, comprising sequence of the following steps:

storing preferred units of measure for each user, displaying a data entry form to a remote seller in response to a request to post a new item for sale, said form including fields for entry of commodity, dimension of the metal and asking price, requiring the entry of a commodity type by the seller, modifying said form to display a set of attributes uniquely associated with the commodity selected by the seller, displaying a list of values for an attribute upon selection of the attribute by the seller, storing the commodity, attributes, dimensions, and asking price for the item, displaying a non-editable version of said entry form in response to a request therefor by a prospective buyer, converting dimension and asking price data entered by a seller to the preferred units of measure of a prospective buyer prior to display of said non-editable version of said entry form.

2. The method defined in claim 1 including the additional step of electronically mailing a bid from a buyer to a seller of an item and electronically mailing a response by the seller to the buyer.

3. An interactive on-line computer system for assisting remote users in the process of buying and selling spot metals, comprising:

means for displaying a data entry form to a remote seller in response to a request to post a new item for sale, requiring the selection by the seller of one of a plurality of commodities for sale, means for modifying said form to display a set of attributes uniquely associated with the commodity selected by the seller, means responsive to selection of each attribute by the seller, for displaying a list of values for the attribute selected, said form including fields for entry of the dimensions of the metal and a asking price for the item, means for storing said dimension and asking price data entered by said seller and for storing preferred units of measure for each user, means for displaying a non-editable version of said entry form to a prospective buyer in response to a request therefor, means for converting dimension and asking price data entered by a seller to said preferred units of measure of a prospective buyer prior to display of said non-editable version of said entry form.

4. The system defined in claim 3, further including;

means permitting a buyer to enter a bid on a item displayed, electronic mail means for communicating said bid to the seller of the item and for communication a response by said seller to said buyer.

5. The system defined in claim 4, wherein said bid may be entered directly or as a percentage of the asking price.

6. The system defined in claim 5, further including;

means for transmitting formatted facsimiles of a bid to a seller and an acceptance or rejection of the bid by the seller.

7. The system defined in claim 6, wherein the means for transmitting facsimiles, further includes means for charging a service fee based on preferences established by the user.

8. The system defined in claim 7, further including;

means for displaying a browseable list of inventory of posted items for sale in response to a request by a buyer, said list including an item identification number, a commodity identification code, dimensions, and asking price.

9. An interactive on-line computer system for assisting remote users in the process of buying and selling spot metals, comprising:

means for displaying a data entry form to a remote seller in response to a request to post a new item for sale, requiring the selection by the seller of one of a plurality of commodities for sale, means for modifying said form to display a set of attributes uniquely associated with the commodity selected by the seller, means responsive to selection of each attribute by the seller, for displaying a list of values for the attribute selected, said form including fields for entry of the dimensions of the metal and a asking price for the item, means for storing preferred units of measure for each user, means for displaying a browseable list of inventory of posted items for sale in response to a request by a buyer, said list including an item identification number, a commodity identification code, dimensions, and asking price.

means for sorting and displaying said list based on a predetermined criteria selected by a buyer, means for searching said list using a search criteria entered by a buyer and displaying the results of said search, and means for converting dimension and asking price data entered by a seller, to the preferred units of measure of a prospective buyer prior to display of said posted items.

* * * * *